Figure 3:
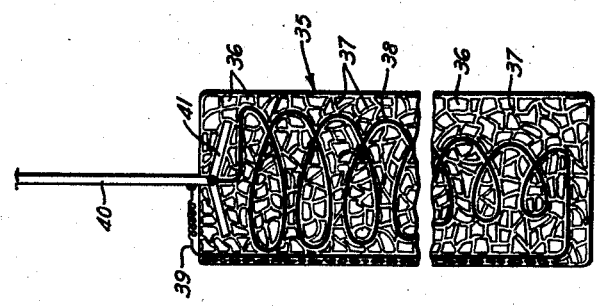

Jan. 21, 1958 A. J. TEPLITZ 2,820,521
DEVICE FOR COMBATTING LOST CIRCULATION
Filed Dec. 30, 1954

INVENTOR.
ABRAHAM J. TEPLITZ
BY

HIS ATTORNEY

United States Patent Office

2,820,521
Patented Jan. 21, 1958

2,820,521

DEVICE FOR COMBATTING LOST CIRCULATION

Abraham J. Teplitz, Penn Township, Allegheny County, Pa., assignor to Gulf Research & Development Company, Pittsburgh, Pa., a corporation of Delaware Application December 30, 1954, Serial No. 478,749

5 Claims. (Cl. 166—60)

This invention relates to improved method and means for stopping lost circulation of drilling fluids and refers particularly to apparatus containing improvements specifically adapted to stopping such lost circulation.

A major factor in the high cost of drilling many wells is the lost circulation of drilling fluid or mud into openings in loss or thief zones in formations penetrated by the borehole; such lost circulation, in addition to involving loss of costly materials and expensive rig time, can result in stuck drill pipes, a lost hole, blow-out, or abandonment. When a condition of lost circulation once occurs, it is necessary, generally, to seal off the thief zone before continuing the drilling operation. It has been the practice to introduce sealing material, usually a time-setting material such as cement, through the drill pipe and into the formation to plug the openings in the loss zone. In this method, a large volume of drilling mud must be lost in the course of being displaced into the loss zone ahead of the sealing material, and there is, in addition, no assurance that the sealing material will set up in the openings to the loss zone and thus great quantities of sealing material may penetrate the loss zone and be lost also. If too much displacing fluid is used, the sealing material will be driven too far back in the loss zone to be effective; if too little is used, the sealing material will not reach the zone. Furthermore, the sealing material may become diluted with drilling fluid in the course of being pumped to the loss zone and consequently fail to set up properly.

An object of my invention is to provide means whereby sealing material can be delivered in concentrated form to the point of lost circulation without incurring additional loss of drilling fluid and can be fed to openings at a moderate pressure which will neither create more openings in the loss zones nor force the sealing material back into the formation where it is unable to form an effective seal.

Briefly stated, my invention consists of a method and means for lowering sealing material to a point in effective relationship to the loss zone in a drilled borehole, the said means consisting primarily of a solid discrete mass having a transverse dimension substantially less than that of the borehole and constituting at least in major part a sealing material which is made available to seal the loss zone by means incorporated in the apparatus for disintegrating the discrete mass, whereby the resulting particulate sealing material is delivered into the loss zone. The discrete mass is suspended on a cable of sufficient length to permit lowering it to the loss zone. The device for disintegrating this discrete mass into a flowable but readily solidifiable material or into particles of a size suitable for plugging a lost circulation zone is actuatable from the ground surface and may be a spring-loaded plunger arranged to shatter a brittle mass; or a heating coil embedded in the mass to melt a low melting sealing material or a binder, or to disintegrate a ceramic material by thermal shock; or it may be a mild explosive embedded therein. Provision for pressing the so-formed particles into the loss zones but no farther thereinto than that part of the zones which immediately surround the drill hole is made by limiting the force of the disintegrating agent, e. g., the explosive, substantially to that required for the disintegration alone. One embodiment of my invention is a protected, elongated discrete mass wherein the mass is covered with a protective layer or envelope which is employed to prevent attacks upon the sealing material by drilling fluid during the lowering of the discrete mass to the lost-circulation zone and/or prevent premature dissemination of particles from the discrete mass.

My method of sealing loss zones consists essentially of lowering into drilling fluid, balanced against formation pressures in the well after a condition of lost circulation has arisen, a discrete mass of sealing material, disintegrating the sealing material physically or thermally, and thereafter introducing a fluid on top of the column of drilling fluid in the borehole to displace the disintegrated particles of sealing material into openings in the loss zone, thereby sealing said openings.

The discrete body can consist of a homogeneous mass of sealing material or of bonded particles, which may be sized according to a prescribed size distribution to seal the loss zone being treated. An example of a homogeneous mass is a solid body of cast sulfur containing an embedded explosive of sufficient force to fragment the sulfur but not to force the fragments deeply into the loss zones. Another example of a homogeneous mass is a solid body of pressed bentonite also containing an embedded explosive of like force; it can be coated with a moisture-impermeable tegument such as shellac, varnish, tar, or pitch to prevent the bentonite from being hydrated by the drilling fluids through which it is lowered. Still other examples of homogeneous masses comprise a metal, metal alloy or plastic of low melting point, in which is embedded a heating coil which can be energized from the surface through wired connections to melt the metal, alloy, or plastic when the body has been placed in operational relationship to the located loss zone, the molten material then rapidly solidifying as it flows into the surrounding zone. Solid discrete masses containing embedded means for distintegrating the mass can also include particularized sealing material which is bonded in the mass by a material of low melting point such as sulfur, or asphalt. Sealing-material particles of this type can include bentonite particles or, in one embodiment of my invention, sized nut shells such as walnut shells having a size distribution specifically composed to seal large openings. The solid discrete bodies which supply solid fragments upon their disintegration by thermal shock or physical means are preferably scored on the surface so as to furnish particles of a desired size to seal the openings. In addition a compressed bentonite of substantially large particle size can be molded in a discrete mass employing a low melting binder which will melt upon application of heat after the body is placed at the point of lost circulation thus releasing individual particles, or an explosive can be embedded in the heterogeneous mass of bentonite lumps and binder.

My apparatus includes, for example, as means for initiating the disintegration of the discrete cohesive mass of sealing material, a switch in the line connecting a source of electrical energy with a heating element and operable at the ground surface; or a dropped go-devil to strike and directly break the mass or trigger a spring-loaded plunger or electrical circuit.

An important feature of my method and means of sealing loss zones is the fact that even when a mild explosive is used to disintegrate the discrete mass, nevertheless no more explosive is employed than is required to effect such disintegration and allow the so-obtained particles to flow into the openings of the loss zone. In case the said particles are too light to displace drilling fluid or they remain in a static mass in drilling fluid, the particles can be moved into the openings by the aforementioned addition of fluid to the top of the static column of balanced drilling fluid in the borehole. In any case, no such force is employed to disintegrate the mass as would be required to rupture a metal sheath surrounding a charge of sealing material, which excessive force has been found to rupture the loss formation and increase the problem of sealing the formation.

It has been found that such severe pressures, when employed in forcing sealing material into fractures, open the fractures and aggravate the problem of lost circulation and, in addition, force the sealing material back into cavities made accessible by the fractures rather than setting it at points where sealing must be accomplished.

The suspending means by which the discrete body is lowered into the borehole and held in position in the fractured zone can be any cable or the like capable of suspending the weight of the body and can comprise a wired connection to energize a heating coil or set off an explosive.

Figure 2:
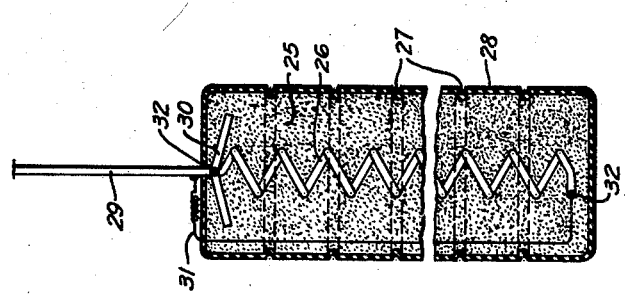
Figure 1:
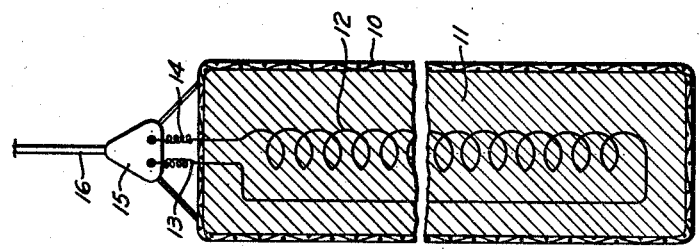

In the accompanying drawing which serves to illustrate preferred embodiments of the present invention, Fig. 1 is an elevational view partly in cross section of one device for delivering, as a discrete mass, sealing material to a loss zone, the material in this case being released by thermal means, Fig. 2 is an elevational view partly in cross section of a homogeneous, discrete mass containing an embedded mild explosive for disintegrating the mass into particles at the point of lost circulation, and Fig. 3 is an elevational view partly in cross section of a heterogeneous, discrete mass consisting of bonded particles of a sized sealing material.

Referring now particularly to Fig. 1, a woven-wire basket 10 of large open mesh supports a discrete mass of low melting point material 11 in which is embedded a heating coil 12 having connecting wires 13 and 14 which lead to a connector 15 which is, in turn, connected to a cable 16. Cable 16 extends to the ground surface and serves to support and permit raising and lowering of the discrete mass, and to conduct electricity from the ground surface to energize the heating coil 12.

When connection is made between the lines 13 and 14 to the source of electrical energy by closing a switch (not shown) at the ground surface the heating coil 12 is thus energized and will melt the low-melting point homogeneous solid surrounding the coil. The rate of melting is rapid because of the fact that the materials being melted completely surround the heating coil to the exclusion of other materials such as drilling fluid which would dissipate the heat. The basket 10 holds lumps of the low melting point material around the heating coil so that large sections of the mass will not drop away from the coil before they have melted. After use, the basket device can be withdrawn from the borehole by the supporting cable.

Referring now to Fig. 2, a discrete mass 25 consists of a cast or pressed solid, for example, compressed bentonite, set cement, cast sulfur, or a solidified synthetic resin. Embedded in the solid is a mildly explosive tape or ribbon 26; the tape 26 extends substantially completely along the length of the mass 25 and is preferably slightly coiled to increase its explosive effect. Disposed apart at uniform distances on the surface of the mass 25 are grooves 27 which govern the size of the pieces of solid material that are formed when the ribbon 26 is exploded and the mass 25 is disintegrated. A coating 28 encloses the entire mass 25 and consists of a protective water-impermeable tegument. This coating 28 prevents water of the drilling fluid from hydrating any hydroscopic, sensitive material such as bentonite which may make up the mass 25. The coating 28 can consist of a tar, pitch, asphalt, shellac, varnish, crude oil residue or synthetic resin.

The mass 25 is suspended on a cable 29, the lower end of which may consist of a fork 30 embedded in the mass 25. The cable 29 is employed to lower the mass 25 from the ground surface into the borehole and suspend the mass at the point of lost circulation, and to conduct electricity from the ground surface to the wires 31 and, through contact points 32 to a detonator cap (not shown) and to the explosive ribbon 26. A source of electrical energy and a switch (not shown) at the ground surface provide the actuating means for exploding the ribbon 26. An alternative means for setting off the explosive ribbon 26 can be a small dry cell battery mounted with the discrete mass and connected to the ribbon 26 through lines containing a switch which is actuatable from the ground surface. Means for actuating the switch can include a dropped go-devil which rides the cable 29 to a point of contact with the switch; in another alternative a small spring operated timer-switch can be set at the ground surface to allow sufficient time to lower the discrete mass to the point of lost circulation before the ribbon is exploded.

When the ribbon 26 is exploded, the solid particles resulting from the disintegration of the mass 25 and conforming generally in size to that determined by the grooves 27 will flow with the current of drilling fluid and escape into the entrance of the fractures forming the loss zone. Herein these particles will arch and seal the fractures. Good results can be obtained by the employment of unusually small amounts of sealing material probably because, by grooving the surface, a substantial number of particles of large size suitable for sealing large fractures can be obtained, and more particularly, because the explosive need only be strong enough to disintegrate the block in which it is cast and not to destroy an entire enclosing shell, the force of which explosion would necessarily drive the sealing material deep into the loss zone.

In Fig. 3, a third embodiment of my invention is shown. A heterogeneous discrete solid mass 35 is made by casting particles 36 of predetermined size distribution in a binder 37 of substantially lower melting temperature than that of the particles 36. The binder can be, for example, a low melting plastic or alloy, a pitch or other organic binder. Embedded in the heterogeneous discrete solid mass 35 is a heating coil 38 which extends substantially the entire length of the solid 35. The coil is frusto-conical in outline to ensure relatively uniform melting of the binder and prevent bound particles dropping away; the inverse conical shape will help support the partly melted mass. When the coil 38 is energized, it will melt the binder 37 and permit the sized particles 36 to flow with escaping drilling fluid into the entrance of the fractures forming the loss zone. Thus the particles are delivered to the fractures without employing excessive driving force which would cause them to penetrate into the loss zone to a position where it is impossible to seal the zone.

A source of electrical power and a switch (not shown) at the ground surface energizes the coil 38 to which the source is connected through wires 39. The solid 35 is suspended from ground level on a cable 40, the lower end of which is cast into the solid 35 and can consist of a fork 41. Since the wires 39 are suspended with the cable 40 and attached to the coil 38, the latter may often be recovered after melting off the heterogeneous solid 35 and be withdrawn with the cable to the surface. The coil can then be cast in a new block for further treatment of a loss zone.

Other combinations of the features above described can be made to provide other specific embodiments within the scope of my invention as defined by the claims hereinafter made.

Having described my invention, I claim:

1. An apparatus for plugging fractures in formations penetrated by a drilled borehole, the said apparatus consisting essentially of a solid elongated self-supporting monolithic mass having a width substantially less than that of the borehole, said monolithic mass consisting of a major part of discrete solid particles of a plugging material bound together by a binding material of low melting point; a cable attached to the solid mass for suspending the said solid, the cable being of sufficient length to lower the said solid from the ground surface to the fractured formation; a heating coil embedded in the said solid mass; a line for electrically connecting the coil to a source of energy for energizing the heating coil; and a switch in the said connecting line operable from the ground surface to initiate the energizing of the heating coil, whereby the coil is heated, the solid mass is disintegrated, and the plugging material is delivered to the fracture.

2. The apparatus of claim 1 in which the major portion of the mass consists of sized particles of plugging material held in a solid mass by a minor amount of low melting point binding material, the size of said particles having been selected to provide optimum sealing of the said fractures.

3. The apparatus of claim 1 in which the plugging material constituting at least the major part of the said mass is a hydratable solid plugging material and in which the mass is coated with a continuous moisture-impermeable coating.

4. An apparatus for plugging formations penetrated by a borehole comprising a solid mass of a plugging material solid at the temperatures normally existing in the formation, said solid plugging material adapted to change to a fluid phase on heating to temperatures higher than the temperature of the formation to be plugged, means adjacent the mass adapted to heat the solid to change it to a fluid phase, a cable connected to the mass and extending to the well head, means operable from the well head through the cable to actuate the means for heating the solid mass whereby the mass becomes fluid and flows into the formation to plug the formation.

5. An apparatus for sealing fractures causing loss of circulation of drilling fluid in formations penetrated by a drilled borehole, the said apparatus consisting essentially of a solid monolithic self-supporting mass of a solid plugging material having a relatively low melting point higher than the temperature of the fractured formation, a cable connected to the mass adapted to extend from the fractured formation to the top of the borehole to support the mass adjacent the fractured formation, a heating coil embedded in the mass, means electrically connecting the heating coil to a source of electrical energy, and a switch in said electrically connecting means operable from the surface to energize the heating coil whereby the plugging material is melted from the mass for delivery into the fractures.

References Cited in the file of this patent

UNITED STATES PATENTS

| | | |
|---|---|---|
| 1,393,311 | Pendleton | Oct. 11, 1921 |
| 1,588,643 | Alexander | June 15, 1926 |
| 1,592,104 | Hallvarson | July 13, 1926 |
| 1,734,670 | Greene | Nov. 5, 1929 |
| 1,816,100 | Ulrik | July 28, 1931 |
| 1,934,701 | Edwards et al. | Nov. 14, 1933 |
| 2,087,297 | Pew | July 20, 1937 |
| 2,363,269 | Schlumberger | Nov. 21, 1944 |
| 2,650,195 | Cardwell et al. | Aug. 25, 1953 |

UNITED STATES PATENT OFFICE
CERTIFICATE OF CORRECTION

Patent No. 2,820,521 January 21, 1958

Abraham J. Teplitz

It is hereby certified that error appears in the printed specification of the above numbered patent requiring correction and that the said Letters Patent should read as corrected below.

Column 6, line 2, before "means" insert -- and --.

Signed and sealed this 25th day of November 1958.

(SEAL)
Attest:

KARL H. AXLINE
Attesting Officer

ROBERT C. WATSON
Commissioner of Patents